United States Patent
Russell et al.

(10) Patent No.: US 7,803,215 B2
(45) Date of Patent: Sep. 28, 2010

(54) ADSORBER FOR PRETREATMENT OF NATURAL GAS CONTAINING BULK HYDROGEN SULFIDE

(75) Inventors: Bradley P. Russell, Wheaton, IL (US); Mark E. Schott, Palatine, IL (US); Gordon T. Cartwright, Tyler, TX (US)

(73) Assignee: UOP LLC, Des Plaines, IL (US)

( * ) Notice: Subject to any disclaimer, the term of this patent is extended or adjusted under 35 U.S.C. 154(b) by 257 days.

(21) Appl. No.: 11/954,437

(22) Filed: Dec. 12, 2007

(65) Prior Publication Data

US 2009/0151562 A1 Jun. 18, 2009

(51) Int. Cl.
*B01D 53/04* (2006.01)
(52) U.S. Cl. ............... 95/136; 95/143; 423/230; 208/208 R; 208/310 R; 585/822
(58) Field of Classification Search ............ 96/4, 96/108, 121, 132–135, 143, 144, 243; 95/43, 95/117, 136, 143, 235; 423/220, 228, 229; 208/208 R, 310 R; 585/820, 822
See application file for complete search history.

(56) References Cited

U.S. PATENT DOCUMENTS

| | | | | |
|---|---|---|---|---|
| 4,440,551 A | * | 4/1984 | Henning et al. ............ | 95/105 |
| 4,770,676 A | * | 9/1988 | Sircar et al. .............. | 95/99 |
| 4,881,953 A | | 11/1989 | Prasad et al. ............. | 55/16 |
| 5,013,334 A | | 5/1991 | Maurer .................... | 55/26 |
| 5,089,034 A | * | 2/1992 | Markovs et al. ........... | 95/99 |
| 5,171,333 A | | 12/1992 | Maurer .................... | 55/26 |
| 5,250,088 A | | 10/1993 | Yamaguchi et al. ........ | 95/98 |
| 5,258,059 A | | 11/1993 | Yamaguchi et al. ....... | 95/100 |
| 5,433,770 A | | 7/1995 | Kass et al. ............... | 95/103 |
| 5,658,372 A | | 8/1997 | Gadkaree ................. | 95/116 |
| 5,846,295 A | * | 12/1998 | Kalbassi et al. .......... | 95/105 |
| 6,814,787 B2 | * | 11/2004 | Golden et al. ............ | 96/132 |
| 6,888,039 B2 | | 5/2005 | Pidgeon .................. | 585/826 |
| 7,063,732 B2 | * | 6/2006 | Katikaneni et al. ........ | 95/135 |
| 7,189,280 B2 | * | 3/2007 | Alizadeh-Khiavi et al. .. | 95/130 |
| 7,211,128 B2 | * | 5/2007 | Thomas et al. ............ | 95/135 |
| 7,442,233 B2 | * | 10/2008 | Mitariten ................ | 95/123 |
| 2006/0254425 A1 | * | 11/2006 | Baksh et al. ............. | 96/132 |
| 2007/0006732 A1 | * | 1/2007 | Mitariten ................ | 95/237 |

FOREIGN PATENT DOCUMENTS

EP 0 284 228 A1 4/1988
EP 0 509 168 A1 4/1991

* cited by examiner

*Primary Examiner*—Frank M Lawrence
(74) *Attorney, Agent, or Firm*—Mark Goldberg

(57) ABSTRACT

The invention relates to a process for removing heavy hydrocarbons and hydrogen sulfide from natural gas. The combination of a silica-gel and an activated carbon adsorber allow for a significant reduction in the overall bed volume required for removal of hydrocarbons.

20 Claims, No Drawings

ADSORBER FOR PRETREATMENT OF NATURAL GAS CONTAINING BULK HYDROGEN SULFIDE

BACKGROUND OF THE INVENTION

The present invention relates to a process for removing heavy hydrocarbons and hydrogen sulfide from natural gas. More particularly, the invention relates to an efficient design to remove heavy hydrocarbons ($C_5^+$) even when hydrogen sulfide has adversely affected the ability of the standard adsorbent to remove heavy hydrocarbons from a natural gas stream.

A large fraction of the world's total natural gas reserves has the problem of being "sour" in that they contain substantial amounts of hydrogen sulfide, which is both highly toxic and tends to embrittle steel pipelines, making the transport of gases by pipeline highly dangerous and unreliable. Much of world's total natural gas reserves also has the problem of being "static," i.e., the gas is located in remote geographic regions that make it uneconomical to transport the gas via pipeline or to refine and/or condense the gas on site and ship it to market in liquid form. The world's total natural gas reserves also include much that is poor in quality because the methane and other combustible gas components are diluted with non-combustible carbon dioxide and nitrogen gas, making the unrefined gas a relatively low Btu fuel source.

Thus, for many years, the need has existed to convert sour natural gas which may also be static and/or poor into a more valuable commercial product which could then be transported in large quantities by inexpensive means (preferably by ship or pipeline). The current state of industrial practice with sour natural gas that is also static and poor is illustrated by Exxon's development of the Natuna gas fields located in the middle of the South China Sea. Because the natural gas deposits contain high percentages of $CO_2$ and $H_2S$, the gas is considered both poor and sour. In that project the $CO_2$ and $H_2S$ are removed by liquefying and fractionally distilling the gas. This approach, while technically feasible, is very expensive. The static gas problem was resolved by developing a local use for the gas on site, namely as a fuel for use in producing steam for secondary oil recovery in the same remote geographic location. The Exxon approach made good economic sense because it began with two low value natural resources (a static, poor quality sour gas field and a depleted oil field) and finished with a relatively high quality crude oil end product using secondary oil recovery techniques. The natural gas intended to be treated by means of the method according to the invention may be saturated with water. This natural gas is generally at the pressure and at the temperature of the production well or of any process used upstream.

The hydrocarbons in the natural gas can be such that at least 95% by weight of their compounds have one to seven carbon atoms. Generally, the hydrocarbons essentially contain compounds having one to two carbon atoms. About 2 to 10% by weight are considered heavier hydrocarbons, having at least five carbon atoms up to thirty or more carbon atoms. The natural gas intended to be treated contains a substantial amount of hydrogen sulfide. A substantial amount generally means between 5 and 50% by mole, preferably between 20 and 45% by mole, in particular between 30 and 40% by mole, for example, 35% by mole.

Natural gas usually contains a significant amount of carbon dioxide. The proportion of carbon dioxide can range up to 50% by mole or higher, often from 10 to 40% by mole. A typical sour natural gas can, for example, contain 50 to 70% by mole of methane, 5 to 15% by mole of ethane, 0 to 5% by mole of propane, 5 to 50% by mole of hydrogen sulfide and 0 to 30% by mole of carbon dioxide. By way of example, the natural gas to be treated can contain 56% by mole of methane, 0.5% by mole of ethane, 0.2% by mole of propane, 0.03% by mole of butane, 0.25% by mole of water, 10.6% by mole of carbon dioxide, 31.5% by mole of hydrogen sulfide and various other compounds as traces.

There are a number of different methods that have been used to treat natural gas streams. In most methods, a combination of technologies is employed to remove condensable components as well as gaseous components such as carbon dioxide. In one process, adsorbents such as silica gel are used to remove heavy hydrocarbons followed by use of an amine solvent to remove carbon dioxide and hydrogen sulfide. Another particularly useful method involves permeable membrane processes and systems that are known in the art and have been employed or considered for a wide variety of gas and liquid separations. In such operations, a feed stream is brought into contact with the surface of a membrane, and the more readily permeable component of the feed stream is recovered as a permeate stream, with the less-readily permeable component being withdrawn from the membrane system as a non-permeate stream.

Membranes are widely used to separate permeable components from gaseous feed streams. Examples of such process applications include removal of acid gases from natural gas streams, removal of water vapor from air and light hydrocarbon streams, and removal of hydrogen from heavier hydrocarbon streams. Membranes are also employed in gas processing applications to remove permeable components from a process gas stream. Natural gas as produced from a gas well presents a separations challenge. Often the natural gas is found together with other components such as sulfur compounds, water, and associated gases. The associated gases found in natural gas streams typically include carbon dioxide, hydrogen sulfide, nitrogen, helium, and argon. Generally, these other gas components are separated from the natural gas by bulk methods employing membrane systems.

Membranes for gas processing typically operate in a continuous manner, wherein a feed gas stream is introduced to the membrane gas separation module on a non-permeate side of a membrane. The feed gas is introduced at separation conditions which include a separation pressure and temperature which retains the components of the feed gas stream in the vapor phase, well above the dew point of the gas stream, or the temperature and pressure condition at which condensation of one of the components might occur. The feed gas stream fed to the gas separation membrane may contain a substantial amount of moisture and condensable hydrocarbons. These condensable components can cause problems in downstream equipment, such as condensation in the membrane elements, thereby causing membrane swelling, or coating of the membrane surface, leading to decreased permeability. In order to compensate for damage caused by condensation of the feed gas stream during the lifetime of a membrane system, such membrane systems are often oversized to compensate for the loss of membrane surface over the useful life of the membrane. However, for high volume gas treating application, this over design of membrane capacity can be very costly, adding millions of dollars to the cost of a membrane system. One approach to extend the membrane life is to pretreat the natural gas prior to sending it to the gas separation membrane. In the UOP MemGuard process thermal swing adsorption (TSA) units are used to pretreat the natural gas feed to the membrane process. These TSA units use silica gel or aluminosilicate gel adsorbents to remove heavier hydrocarbons and water from the natural gas. This pretreatment prevents condensation in the membrane process and the subsequent coating of the membrane surface with heavy hydrocarbons, thereby extending membrane life.

Another method for treating natural gas streams involves the use of an amine solvent process. It is often necessary to remove the higher hydrocarbons before the feed stream contacts the amine solvent, for example to prevent foaming problems.

U.S. Pat. No. 4,881,953 to Prasad et al. discloses an approach to the problem of preventing premature loss of membrane capacity by passing the feed gas mixture through a bed of adsorbent material, such as activated carbon to adsorb contaminants such as heavier hydrocarbon contaminants without the removal of lighter hydrocarbons. Prasad requires that a means for removing moisture from the feed gas be provided because high moisture levels generally limit the ability of activated carbon adsorbents to retain their adsorptive capacity for heavy hydrocarbons.

SUMMARY OF THE INVENTION

The invention comprises a process for pretreatment of a natural gas stream containing methane, higher hydrocarbons, hydrogen sulfide and carbon dioxide wherein the process comprises passing a natural gas stream through at least one layer of a silica gel adsorbent and then through at least one layer of an activated carbon adsorbent. These layers may be found contained either in a single adsorbent bed or within separate adsorbent beds. The silica gel adsorbent and the activated carbon adsorbent are present in a ratio of between 80/20 and about 20/80 by volume. The addition of the activated carbon adsorbent bed allows for a significant reduction of the overall adsorbent bed volume needed to remove higher hydrocarbons, especially hydrocarbons between $C_5$ and $C_{12}$. The activated carbon adsorbent removes at least 50% of the higher hydrocarbons. The flow during the regeneration step reverses to first send a hot regeneration gas through the activated carbon layer and then through the silica gel layer. This invention is particularly advantageous with temperature swing adsorbers. After pretreatment of the natural gas stream, a purified natural gas stream is sent to a treatment zone comprising a membrane unit or an amine containing solvent. The adsorbent bed has at least a 25% greater capacity for removal of hydrocarbons than an adsorbent bed of an identical volume that consists of silica gel.

DETAILED DESCRIPTION OF THE INVENTION

There is increased interest in processing of sour natural gas streams that contain bulk concentrations (10-40%) hydrogen sulfide. However, it has been found that $H_2S$ can significantly reduce the performance of an adsorbent pretreatment unit that functions to remove higher hydrocarbons ($C_5$ to $C_{12}$) from the natural gas stream. This is due to competitive adsorption of the $H_2S$ on the silica gel adsorbent together with the hydrocarbons. A method is now provided in the present invention to resolve this problem.

It has now been found that by adding a layer of activated carbon near the effluent end of the adsorbent bed, the hydrocarbon removal capacity for $H_2S$-containing natural gas can be significantly increased in a temperature swing adsorption system (TSA). The activated carbon preferably adsorbs the hydrocarbons as compared with $H_2S$. A silica gel layer continues to be used since the heavier hydrocarbons ($C_{12+}$) are not affected to the same degree as the lighter hydrocarbons by the $H_2S$ coadsorption and since the higher hydrocarbons are easier to strip off the silica gel as compared to the activated carbon. The natural gas feed first passes through the silica gel layer and then through the activated carbon layer. A regeneration step is performed in which a hot, clean regeneration gas passes first through the activated carbon layer and then through the silica gel layer. A cool, clean flow of gas can then be passed through the adsorbent to return it to operating temperatures.

In order to estimate the effect of $H_2S$ coadsorption on hydrocarbon equilibrium loading, multi-component loadings were predicted from measured pure component loading data on Engelhard Sorbead H aluminosilicate gel and Calgon BPL activated carbon. It was found that there was a strong suppression of $nC_8$ loading by coadsorption of $H_2S$ on the silica gel adsorbent. Above about 25 bar, carbon had a greater $nC_8$ loading per unit bed volume than did silica gel.

An important consideration in using activated carbon is the regenerability. Since activated carbon adsorbs heavy hydrocarbons so strongly, it is important to determine if the hydrocarbons can be stripped off effectively during the regeneration step in the TSA cycle. In order to study the performance of a silica-gel/activated-carbon layered bed in a TSA cycle, simulation results were produced and analyzed. It was found that the bed size factor (adsorber bed volume divided by the molar gas flow rate) required to remove $nC_8$ with 100% silica gel more than doubles when $H_2S$ is added to the feed. This compares to the bed size factor only increasing by 42% when a bed containing 50% silica gel/50% activated carbon is used. The overall bed size factor is 32% lower for the compound bed compared to a 100% silica gel bed.

The conditions considered for determining these simulated conditions involved one feed at a temperature of 40° C., pressure of 80 bar, containing 50 mol % $CO_2$, 0.484 mol % $nC_8$ (saturated) and the balance $C_1$. A second feed was at the same temperature and pressure but contained 25 mol % $CO_2$, 25 mol % $H_2S$ 0.408 mol % $nC_8$ (saturated) and the balance $C_1$. The feed flow was adjusted to a fixed adsorber volume in order to provide 5% nC8 breakthrough. In the simulation, a three part temperature swing adsorption cycle was employed with a natural gas feed passing through an adsorbent bed for 2 hours to produce a pretreated product. Then a heated regeneration gas stream passes through the adsorbent bed in a countercurrent direction to remove adsorbed hydrocarbons for 1 hour. In the last step a product slip-stream flows through the adsorbent bed to provide cooling after the regeneration step. For the purposes of this simulation, this step also took 1 hour. The regeneration conditions were pressure of 80 bar, temperature of 250° C. and regeneration flow of 18,500 $Nm^3$/hr. The adsorbent bed dimensions were a diameter of 2.5 m and a packed height of 4.0 m.

The results of the simulation showed that in the first feed with no $H_2S$, the bed size factor was 0.312 with 100% silica gel and 0.338 with 50% silica gel/50% activated carbon. This compares to the second feed that contains $H_2S$, having a bed size factor of 0.706 with 100% silica gel and 0.479 with 50% silica gel/50% activated carbon. The bed size factor is calculated by dividing the bed volume (in $m^3$) by the feed rate (in $Nm^3$/hr) times 1,000. These results show the considerable advantage provided by using the combination silica gel/activated carbon adsorbent bed in treating natural gas streams having a significant $H_2S$ content.

The invention claimed is:

1. A process for pretreatment of a natural gas stream containing methane, higher hydrocarbons, 10-40 mole % hydrogen sulfide and carbon dioxide wherein said process comprises passing said natural gas stream through at least one layer of a silica gel adsorbent and then through at least one layer of an activated carbon adsorbent under controlled conditions at which the adsorption capacity of the activated carbon adsorbent for the higher hydrocarbons exceeds that of the silica gel adsorbent.

2. The process of claim 1 wherein said at least one layer of a silica gel adsorbent and said at least one layer of an activated carbon adsorbent are contained within a single adsorbent bed.

3. The process of claim 1 wherein said at least one layer of a silica gel adsorbent and said at least one layer of an activated carbon adsorbent are contained within separate adsorbent beds.

4. The process of claim 1 wherein said silica gel adsorbent and said activated carbon adsorbent are regenerated by first passing a hot regeneration gas through said activated carbon layer and then through said silica gel layer.

5. The process of claim 1 wherein said silica gel adsorbent and said activated carbon adsorbent are present in a ratio of between about 80/20 to about 20/80 by volume.

6. The process of claim 1 wherein said activated carbon adsorbent removes at least 50% of said higher hydrocarbons.

7. The process of claim 1 wherein after said pretreatment of said natural gas stream, a purified natural gas stream is sent to a treatment zone comprising a membrane unit.

8. The process of claim 1 wherein after said pretreatment of said natural gas stream, a purified natural gas stream is sent to a treatment zone comprising an amine containing solvent.

9. The process of claim 2 wherein said adsorbent bed has at least a 25% greater capacity for removal of higher hydrocarbons than an adsorbent bed of an identical volume that consists of silica gel.

10. The process of claim 2 wherein said adsorbent bed is in a thermal swing adsorption unit.

11. A natural gas pretreatment process, comprising:
    selecting a natural gas stream containing higher hydrocarbons and having 10-40 mole % hydrogen sulfide; and
    passing the selected natural gas stream through at least one layer of silica gel adsorbent and through at least one layer of an activated carbon adsorbent at a feed pressure exceeding approximately 25 bar to promote co-adsorption of hydrogen sulfide on the silica gel adsorbent while suppressing higher hydrocarbon loadings thereon.

12. The process of claim 11 wherein said at least one layer of a silica gel adsorbent and said at least one layer of an activated carbon adsorbent are contained within a single adsorbent bed.

13. The process of claim 11 wherein said at least one layer of a silica gel adsorbent and said at least one layer of an activated carbon adsorbent are contained within separate adsorbent beds.

14. The process of claim 11 wherein said silica gel adsorbent and said activated carbon adsorbent are regenerated by first passing a hot regeneration gas through said activated carbon layer and then through said silica gel layer.

15. The process of claim 11 wherein said silica gel adsorbent and said activated carbon adsorbent are present in a ratio of between about 80/20 to about 20/80 by volume.

16. The process of claim 11 wherein said activated carbon adsorbent removes at least 50% of said higher hydrocarbons.

17. The process of claim 11 wherein after said pretreatment of said natural gas stream, a purified natural gas stream is sent to a treatment zone comprising a membrane unit.

18. The process of claim 11 wherein after said pretreatment of said natural gas stream, a purified natural gas stream is sent to a treatment zone comprising an amine containing solvent.

19. The process of claim 12 wherein said adsorbent bed has at least a 25% greater capacity for removal of higher hydrocarbons than an adsorbent bed of an identical volume that consists of silica gel.

20. The process of claim 12 wherein said adsorbent bed is in a thermal swing adsorption unit.

* * * * *